May 3, 1932.  T. REITER ET AL  1,856,969
APPARATUS FOR TREATING LIVING CELLS BY MEANS OF RAYS OF LIGHT
Filed Sept. 26, 1928
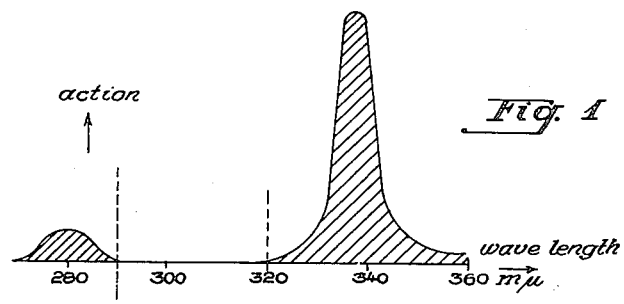
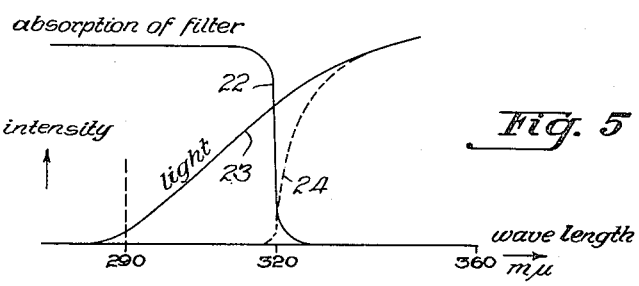
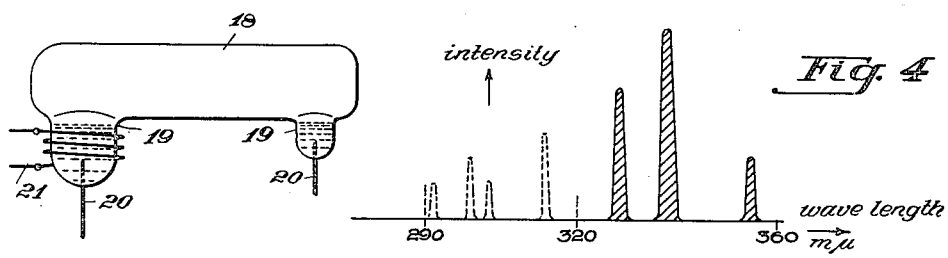
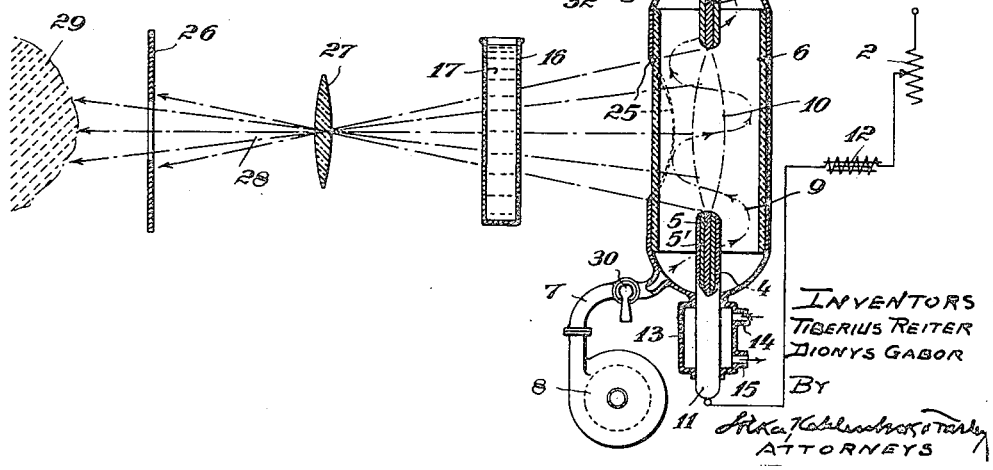
INVENTORS
TIBERIUS REITER
DIONYS GABOR
BY
ATTORNEYS Patented May 3, 1932

1,856,969

UNITED STATES PATENT OFFICE

TIBERIUS REITER AND DIONYS GÁBOR, OF BERLIN-CHARLOTTENBURG, GERMANY, ASSIGNORS TO SIEMENS & HALSKE, AKTIENGESELLSCHAFT, OF SIEMENSSTADT NEAR BERLIN, A CORPORATION OF GERMANY

APPARATUS FOR TREATING LIVING CELLS BY MEANS OF RAYS OF LIGHT

Application filed September 26, 1928, Serial No. 308,467, and in Germany September 6, 1927.

Our invention relates to improvements in apparatus for treating living cells by means of rays of light.

In the treatment of diseases by irradiation from an artificial source of light, such sources of light have primarily been used which possess a high intensity mainly in the ultra-violet part of the spectrum of 290 to 320 m$\mu$, as the strongest biological action has been ascribed to these sources. In any case they cause as specific action of this range a strong reddening of the skin, which is generally considered as a characteristic feature accompanying the healing action. There have also been produced artificial sources of light, by means of which sunlight is imitated as closely as possible. The special kind of healing action of the said sources of light is well known.

Extensive experiments and researches have shown, that a substantially different and quite surprising action may be obtained with light of a definite, strictly confined wave length range. It has been found that a radiation emanates from living organisms in the state of cell division growth, which in its turn also promotes the division of the cells. It has been ascertained, that this is a light radiation of about 340 m$\mu$. The same action is exerted by artificially produced monochromatic rays of light of this wave length, and to a lesser degree also by longer and shorter waves within the range of 330 to 360 m$\mu$.

Reference is to be had to the accompanying drawings, in which Fig. 1 is a diagram or graph illustrating the wave lengths suitable for the purpose of our invention. Fig. 2 is a diagrammatic vertical section of an irradiation apparatus suitable for carrying out our invention; Fig. 3 is a detail showing a special form of irradiating lamp or bulb with a heater arrangement; Fig. 4 is a diagram illustrating the nature of the radiations obtained from a silver arc such as shown in Fig. 2; and Fig. 5 is a diagram illustrating the action of filter screens.

In Fig. 1 of the drawings the cell division radiation is shown graphically. On the abscissa axis is plotted the wave length and on the ordinate axis the action of the radiation on the process of division of the cells. It shows that the action has at 280 m$\mu$ a small, and at a little less than 340 m$\mu$ a large maximum for certain ranges. At about 300 m$\mu$ there is located the so-called erythem radiation, which has a special action on the animal skin.

The cell dividing rays within the range of 340 m$\mu$ may on account of their action in promoting the division of cells be used to speed up the growth of plants, generally for agronomic purposes, as well as for destruction of pernicious tumors.

It is, however, a striking fact, that sunlight, in which rays of the wave length of 340 m$\mu$ also occur in a multiple of the intensity radiated by living organisms in the state of cell division growth, as well as the customary artificial sources of light, do not possess this action. Extensive experiments have shown that the presence or admixture of other rays, particularly within the wave length range of from 320 to 290 m$\mu$, causes the cell dividing action to disappear altogether, even when the intensity of the added rays amounts to but a small fraction of that of the effective rays of 340 m$\mu$ wave length.

This phenomenon is entirely new in radiation biology. Up to now no case is known in which the biological action of any range of rays is hindered or destroyed by the simultaneous action of another range of the spectrum.

The practical utilization of this phenomenon sets the problem how to render operative the effective range of the spectrum isolated up to the necessary degree of purity.

Our invention relates to an apparatus based upon the recognition of this phenomenon, and suitable for the treatment of living cells with rays of light generally, and, as mentioned above, more specifically for the light treatment of diseases, for example, and also for promoting the growth of plants.

In Fig. 2 of the drawings there is shown, by way of example, a suitable irradiation apparatus in diagrammatic representation. The special character of the radiation emitted consists in the presence of rays of wave lengths of 330 to about 360 mμ of very great intensity, while rays of wave lengths below 320 mμ are practically absent. The by itself active radiation of 280 mμ is not utilized on account of its low efficiency, in order to simplify the construction of the apparatus. None of the hitherto employed artificial sources of light is directly applicable, partly because they contain the effective part of the spectrum to an insufficient extent (carbon arc, quartz mercury vapor lamp, tungstem arc lamp), and partly because they contain the hindering portion of the spectrum to an excessive extent (quartz mercury vapor lamp, iron spark gap).

According to the embodiment of our invention illustrated in Fig. 2, an arc lamp connected to a source of alternating current with the interposition of a regulating resistor 2 serves as the source of light; one electrode 3 of said lamp consists of carbon 4 and a pencil of silver 5 surrounded by the carbon. Zinc may be employed instead of the silver. The other electrode 11 consists of silver 5, aluminum 5′ and carbon 4 in concentric arrangement.

Such an arc lamp emits particularly strong rays of light in the wave length range of 330 to 360 mμ. The arc is drawn out as far as possible by well known means. For this purpose it is enclosed in a quartz tube 6, at the bottom of which compressed air is adapted to be introduced through a pipe 7 by means of a small fan 8. The mouth of the tube 7 points in such a direction, that the compressed air flows in approximately the direction of the arrow 9 in a helix around the arc proper 10, and escapes at the top of the quartz tube 6. The compressed air pipe may be closed by a cock 30 and the air outlet 31 likewise by a cock 32, so that the quartz tube may be entirely sealed, whereby the action of the metal vapors on the arc is intensified. A damping choke coil 12 is preferably connected in the circuit of the electrodes 3 and 11.

In order to reduce the intensity of the crater light, the electrodes 6 are preferably cooled. The lower electrode 11 is, for instance, surrounded by a cooling jacket 13 traversed by cooling water flowing through the pipes 14, 15. The upper electrode 3 is surrounded by radiator ribs or gills 3′.

In order to obtain a light radiation, which corresponds exclusively with the desired wave length range of 330 to 360 mμ, a filter screen 16 is placed in front of the arc lamp. According to the embodiment illustrated this screen consists of a container or tank, of lead or nickel glass, for instance, in which is contained a watery or alcoholic solution 17. The following liquids are suitable for the purpose: acetone, cyclohexanone, uric acid, uranin, methylorange III, acid green, methyl violet, dahlia, nitrate of nickel. Particularly suitable is the combination of methylorange III with any violet glass, such as cobalt glass, or with methylviolet in watery or alcoholic solution. The filtering materials need not be used in solution, but may be used for coloring gelatine or cellon filters.

When using a light filter, sources of light may also be employed which emit a radiation extending over a wider range of the spectrum, of which the ineffective or detrimental radiations are then eliminated by the filter. Lamps with luminous bodies or metal vapor lamps, preferably in a quartz envelope, may be used. As metals, which are vaporized in the lamp used, the following are particularly suitable viz. among these of the alkali group: potassium and sodium, of the earth alkali group: calcium and magnesium, of the titanium group: titanium and zirconium, of the rare earths: lanthanum. Particularly suitable have proved some metals of the zinc group: zinc, cadmium and mercury, and some of the ferrous group: cobalt and nickel, because these produce comparatively strong light intensities in the range of the useful radiation.

Preferably two suitable metals are used simultaneously, because a particularly high total light intensity is obtained in the portion of the spectrum of about 330 to 360 mμ. Particularly suitable alloys are alloys of potassium and sodium, which are liquid at ordinary temperatures and may thus be employed in a similar manner as the mercury in mercury vapor lamps. Other suitable alloys are: those of cadmium and zinc, and calcium and magnesium, which are solid at ordinary temperatures, but liquid at the service temperature of the lamp.

The bodies of the lamp may be provided with special heating devices, as shown in Fig. 3. The quartz container 18 is here provided with recesses 19 into which current leads 20 are inserted. One of these recesses is surrounded by an electric heating device 21, by means of which it is possible to liquefy the metal, whereupon the switching in of the lamp takes place by tipping the lamp and allowing the metal contained in the recesses to flow together.

Even if the radiations of a certain metal only are of importance, the employment of metal alloys is necessary, if the metal in question is only usable in a metal vapor lamp in the form of an alloy. This is, for instance, the case with an alloy of aluminium and silver, the proportion of constituents being approximately 3:7, and the desired radiation is to be produced by the evaporation of the silver. In the arrangement according to Fig. 2 of the drawings the conditions regarding the electrodes are also similar.

In Fig. 4 of the drawings the radiation of the silver arc is illustrated in a manner corresponding with Fig. 1. This arc gives very effective cell splitting radiations, within the ranges of about 330, 340 and 350 mμ. On the other hand it emits, between 290 and 320 mμ, radiations which would destroy the cell splitting radiation and must therefore be eliminated by the screens.

In Fig. 5 of the drawings is illustrated the action of the filter screens. The curve 22 shows the absorption effect and the curve 23 the intensity of a certain light radiation. The curve 24 is the result of these two actions and shows that at the back of the screen a radiation of slightly over 320 mμ is operative, which at first increases and in any case, contains the active portion of the cell splitting radiation around 340 mμ to the full extent.

The tube 6 containing the arc is surrounded by a diaphragm, shield, or shutter 25, which prevents the passage of the crater light. A second diaphragm 26 may be provided behind the lens 27, in order to eliminate further edge radiations of the beam of light 28, so that a beam corresponding with the central portion of the arc is projected on to the object 29 to be exposed to the light.

Various modifications and changes may be made without departing from the spirit and the scope of the invention, and we desire, therefore, that only such limitations shall be placed thereon as are imposed by the prior art.

We claim as our invention:—

1. Apparatus for treating living organisms with rays of light, comprising an electric arc lamp with at least one electrode containing silver.

2. Apparatus for treating living organisms with rays of light, comprising an electric arc lamp with long arc enclosed in a tubular container, and a device to propel gas through said container, to steady the arc.

3. In an apparatus for treating living organisms with rays of light, a container pervious to ultra-violet rays, electrodes located within said container and adapted to produce an electric arc, means for limiting the lateral expansion of such electric arc while the electrodes remain stationary, means for cooling the electrodes, and a shield surrounding a portion of said container for screening the object to be treated, against the passage of the crater light.

4. In an apparatus for treating living organisms with rays of light, a container pervious to ultra-violet rays, and electrodes located within said container and containing aluminum and silver respectively, and adapted to produce an electric arc.

5. In an apparatus for treating living organisms with rays of light, a closed air-tight container pervious to ultra-violet rays, electrodes located within said container and embodying a metal of the zinc group, and adapted to produce an electric arc, and a filter screen located between said electric arc and the object to be treated, said screen being constructed to stop the passage of rays having a wave length below 320 mμ.

6. In an apparatus for treating living organisms with rays of light, a metal vapor lamp comprising a quartz envelope, a metal of the zinc group located in said envelope and adapted to produce an electric arc, and a filter screen located between said electric arc and the object to be treated, said screen being constructed to stop the passage of rays having a wave length below 230 mμ.

7. In an apparatus for treating living organisms with rays of light, a metal vapor lamp comprising a quartz envelope, an alloy of metals of the zinc group contained in said envelope and adapted to produce an electric arc, and a filter screen located between said electric arc and the object to be treated, said screen being constructed to stop the passage having a wave length below 320 mμ.

8. In an apparatus for treating living organisms with rays of light, a metal vapor lamp comprising a quartz envelope, an alloy of cadmium and zinc located in said envelope and adapted to produce an electric arc, and a filter screen located between said electric arc and the object to be treated, said screen being constructed to stop the passage of rays having a wave length below 320 mμ.

9. In an apparatus for treating living organisms with rays of light, a container pervious to ultra-violet rays, electrodes located within said container and adapted to produce an electric arc, and means for propelling gas about said arc for limiting lateral expansion of said arc while the electrodes remain stationary.

10. In an apparatus for treating living organisms with rays of light, a container pervious to ultra-violet rays, electrodes located within said container and adapted to produce an electric arc, means for propelling gas about said arc for limiting the lateral expansion thereof while the electrodes remain stationary, and means for cooling the electrodes.

11. In an apparatus for treating living organisms with rays of light, a container pervious to ultra-violet rays, electrodes located within said container and adapted to produce an electric arc, means for propelling gas about said arc for limiting the lateral expansion of said arc while the electrodes remain stationary, and means for screening the object to be treated against the passage of crater light.

In testimony whereof we affix our signatures.

TIBERIUS REITER.
DIONYS GÁBOR.